OR 3,481,665

Dec. 2, 1969   H. E. ROSENBERGER   3,481,665
MULTI-POWERED MICRO-OBJECTIVE GROUP HAVING
COMMON ABERRATION CORRECTING MEANS
Original Filed Nov. 4, 1964   3 Sheets-Sheet 1

HAROLD E. ROSENBERGER
*INVENTOR*

BY Frank C. Parker

*ATTORNEY*

Dec. 2, 1969 H. E. ROSENBERGER 3,481,665
MULTI-POWERED MICRO-OBJECTIVE GROUP HAVING
COMMON ABERRATION CORRECTING MEANS
Original Filed Nov. 4, 1964 3 Sheets-Sheet 2

4.0 x MAG.

10.0 x MAG.

HAROLD E. ROSENBERGER
*INVENTOR*

BY Frank C. Parker

*ATTORNEY*

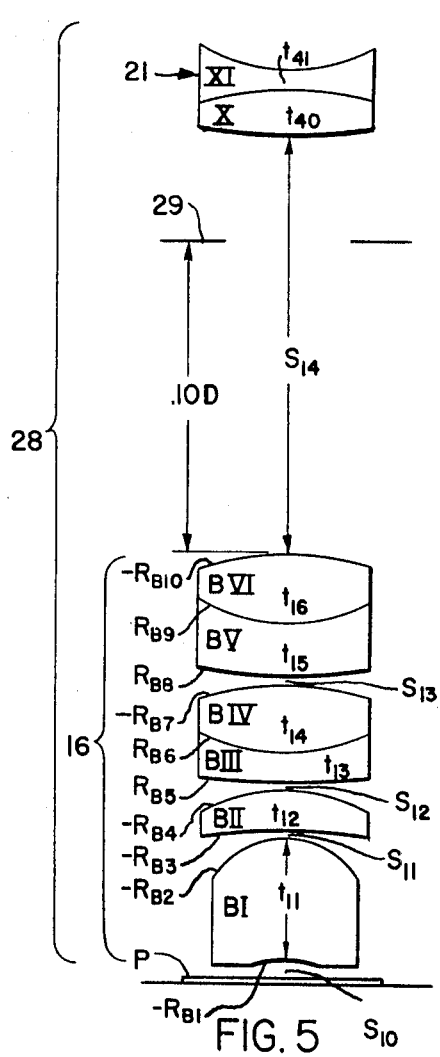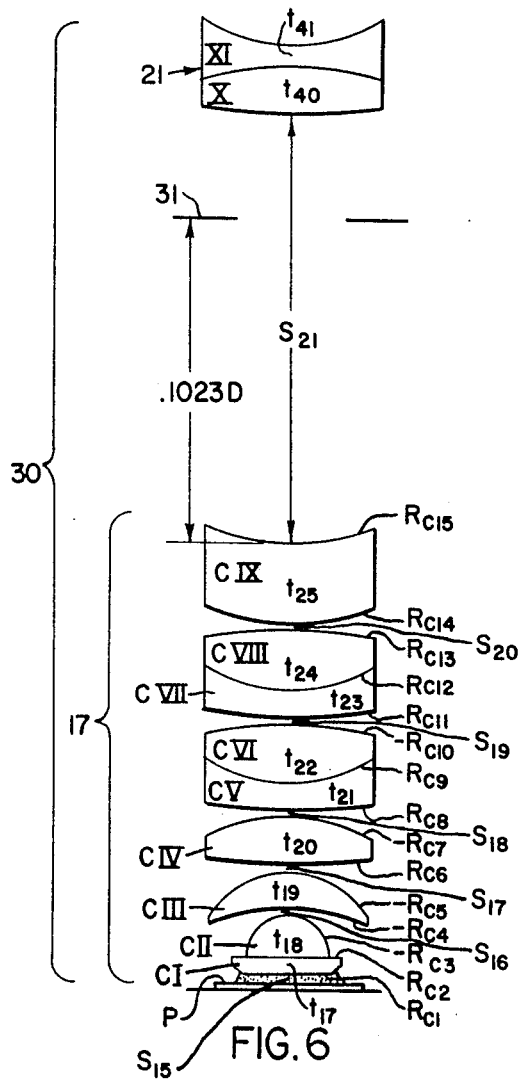

United States Patent Office 3,481,665
Patented Dec. 2, 1969

3,481,665
MULTI-POWERED MICRO-OBJECTIVE GROUP HAVING COMMON ABERRATION CORRECTING MEANS
Harold E. Rosenberger, Brighton, N.Y., assignor to Bausch & Lomb Incorporated, Rochester, N.Y., a corporation of New York
Continuation of application Ser. No. 408,875, Nov. 4, 1964. This application May 2, 1968, Ser. No. 732,485
Int. Cl. B29d 15/00; G02b 9/00, 9/60
U.S. Cl. 350—183
11 Claims

ABSTRACT OF THE DISCLOSURE

A group of micro-objectives having progressively increasing positive powers from low to high values, each of said micro-objectives cooperating individually with a stationary negative lens system used in common to correct the image aberrations, such as field curvature, Petzval condition, secondary spectrum, coma, and astigmatism, produced by the optical system.

CROSS-REFERENCE TO RELATED APPLICATION

This application is a continuation of my copending application Ser. No. 408,875, filed Nov. 4, 1964, now abandoned.

BACKGROUND OF THE INVENTION

The present invention relates generally to optical systems for microscopes and more particularly it relates to means for improving the optical performance of said systems.

Although the prior art shows a continuing advancement in efforts to improve the image quality of optical systems for microscopes, the best of these efforts have been applicable only to the highest grade and most expensive instruments so that widespread use of such instruments has never been achieved.

Efforts to achieve field flattening have been paramount and have followed one or more of the courses indicated herebelow:

(a) The axial distance between the specimen plane and the objective shoulder is increased.
(b) The front lenses are made of the newer unusually high index glasses having low dispersion values.
(c) The front surface of the lens adjacent to the specimen in higher powered dry objectives is formed strongly concave toward the specimen.
(d) Thick meniscus lenses are used at the front and rear of the higher powered objectives.

While the above-mentioned methods, used either singly or in combination, are effective in achieving a satisfactory degree of field flattening, the resultant objective design becomes exceedingly complex involving severe manufacturing difficulties and high costs.

On the other hand, efforts to increase the use of microscopes by reducing the manufacturing cost of the objective optical system have invariably resulted in undesirable reduction in optical performance. The current need of microscope users is a microscope optical system of simple form and comparatively low cost which is capable of high grade performance, particularly as regards astigmatism, coma, spherical aberration and field flatness.

In view of the aforesaid need, it is an object of the present invention to provide an interrelated plurality of novel microscope semi-objectives which are simple in structure and of low cost, but nevertheless capable of an unusually high grade of optical performance.

It is a further object to provide such a plurality of interrelated microscope semi-objectives in combination with an aberration corrector lens member which is used individually with each of the microscope semi-objectives, said corrector lens member acting especially to reduce to near optimum values such optical characteristics as astigmatism and field curvature for each microscope objective combination.

Further objects and advantages will be apparent in the details of construction and combinations and arrangements of the constituent parts of said plurality of microscope objectives which are described in the specification herebelow and are shown in the accompanying drawing, wherein:

FIGS. 3 to 6 are optical diagrams showing the individual microscope objectives having progressively increasing magnifications which are included in said plurality of microscope objectives in a preferred form of the present invention.

Figure 1:
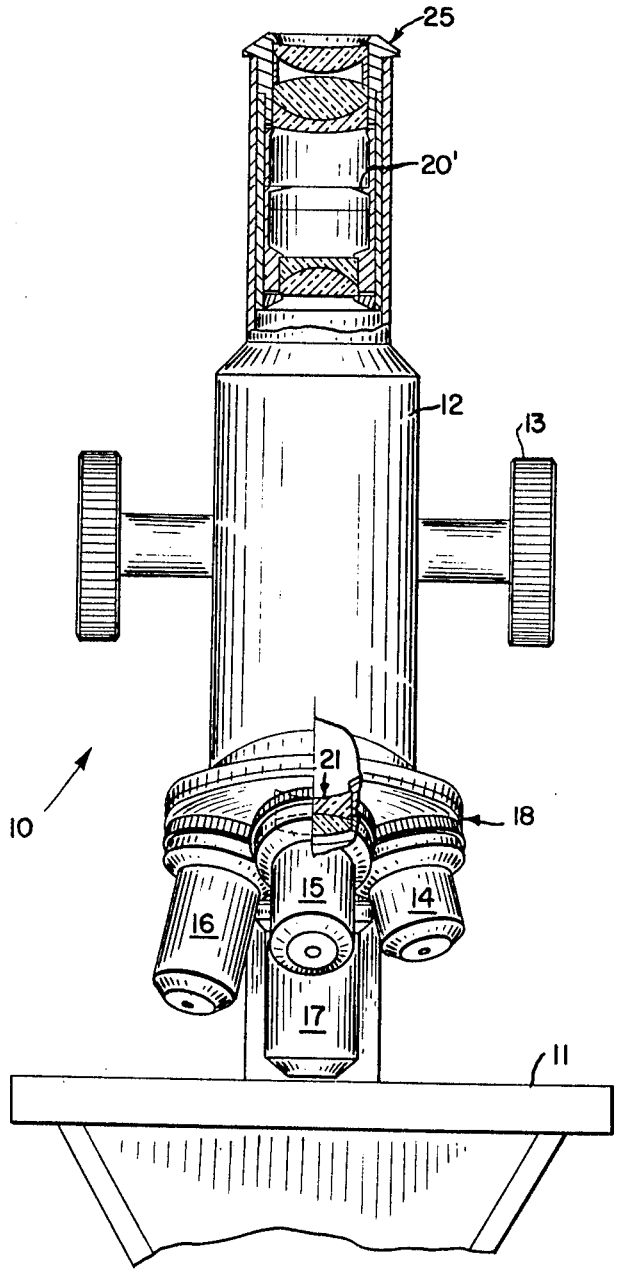
FIG. 1 is a front elevation of a multi-objective microscope showing generally the present invention contained in a microscope, certain parts of which are broken away and shown in section.

Generally speaking, the inventive concept here disclosed is intended to provide a high performance optical system for a plural-objective microscope and particularly the objective lens system, the outstanding improvement being:

(1) Flattening of the field of the objective lens system.
(2) Balancing of lateral color.
(3) Correction of astigmatism.
(4) Correction of spherical aberration and coma.

Improvement in flatness of field is obtained principally by changes in the usual first order parameters of the objective system. Said changes include:

(a) An increase in the focal lengths of the higher powered semi-objectives and a consequent reduction in the undercorrected Petzval sum of these semi-objectives.
(b) Working the semi-objectives at substantially reduced magnifications relative to the magnifications of objectives of comparable numerical aperture in standard objective series.
(c) Working the semi-objectives within a substantially reduced object-to-image distance relative to that within which standard series objectives work.
(d) Introducing a fixed position negative corrector lens, designed to work successively as an integral optical component with each semi-objective of the series, said corrector lens working at a magnification such that the product of semi-objective magnification times corrector lens magnification is equal to the magnification of standard objectives of comparable numerical aperture, and introducing Petzval sum and astigmatism contributions which aid in the correction of the field of each semi-objective.

The new series of microscope objectives 22 are designed for image magnifications of 4.0×, 10.0×, 40.0× and 100.0× in progressive steps, and the individual semi-objectives 14, 15, 16, 17 are correspondingly designed for image magnifications of 0.8×, 2.0×, 10.0×, and 20.0× per se.

To more clearly explain the above reference to focal lengths in paragraph (a), a comparison chart identified as Table I is provided herebelow in which a typical group of standard or conventional microscope objectives are compared numerically with said group of semi-objectives.

TABLE I

Standard objectives

| Magnification: | Focal length, (mm.) |
| --- | --- |
| 3.5× | 30.9 |
| 10× | 15.5 |
| 43× | 4.0 |
| 97× | 1.8 |

Semi-objectives

| Magnification:* | Focal length (mm.) |
| --- | --- |
| 4× | 16.5 |
| 10× | 15.8 |
| 40× | 6.9 |
| 100× | 3.3 |

* When combined with the field corrector lens.

The above references to the correction of astigmatism and Petzval condition are further elucidated by reference to Table II herebelow wherein the Petzval focus as well as the tangential and sagittal foci are evaluated and compared for the same typical group of microscope objectives as used in Table I, the values therein being given in "focal ranges" or range of focus of the respective microscope objectives.

TABLE II

| Standard Objectives | | | | Flat Field Series | | | |
| --- | --- | --- | --- | --- | --- | --- | --- |
| Mag. | Petzval Focus | Tang. Focus | Sag. Focus | Mag.* | Petzval Focus | Tang. Focus | Sag. Focus |
| 3.5× | −0.8 | −3.2 | −1.6 | 4× | −0.3 | −0.4 | −0.3 |
| 10× | −4.3 | −3.9 | −4.2 | 10× | −1.4 | −0.6 | −1.2 |
| 43× | −5.2 | −7.8 | −6.0 | 40× | −1.3 | +0.1 | −0.9 |
| 97× | −12.6 | −14.8 | −13.3 | 100× | −3.8 | −3.9 | −3.9 |

*Includes negative corrector lens. Minus values relate to an undercorrected condition whereas plus values mean overcorrected condition.

In Table III herebelow are given the values in "focal ranges" of correction for Petzval sum, as well as tangential and sagittal foci similar to Table II contributed by the negative corrector lens per se in the objective systems which include the chosen group of semi-objectives.

TABLE III.—FIELD CORRECTOR LENS

| Mag. | Petzval Focus | Tang. Focus | Sag. Focus |
| --- | --- | --- | --- |
| 4× | +1.2 | +10.4 | +4.3 |
| 10× | +1.4 | +11.8 | +4.9 |
| 40× | +0.6 | +8.0 | +3.1 |
| 100× | +0.4 | +5.8 | +1.8 |

In the aforementioned group of semi-objectives, the higher magnification semi-objectives such as 40× and 100× are somewhat overcorrected for lateral color as a consequence of the great difficulty in reducing this characteristic. As a further feature of the invention, the designs of the low magnification semi-objectives such as 4× and 10× deliberately incorporate an amount of overcorrected lateral color substantially equal to that remaining in the higher powered semi-objectives. Since the amount of overcorrected lateral color is substantially the same in all semi-objectives, the correction for lateral color may be completely designed into a single eyepiece.

With reference to FIG. 1 of the drawings, there is here shown a microscope generally designated by the numeral 10, said microscope having a stage 11 and body tube 12 wherein an optical system is mounted. As here shown, relative focusing movement between tube 12 and stage 11 is accomplished by a focusing knob 13 which is operatively connected in any desired manner for accomplishing focusing movement.

According to the present invention, a plurality of interrelated semi-objectives 14, 15, 16 and 17 are provided in a rotatable nosepiece 18. The magnification ratings, focal lengths, and numerical apertures of the respective semi-objectives 14–17 range between low to high values, the magnification values being much less than corresponding values in standard objectives, and the preferred values related to the semi-objectives per se are given in Table IV herebelow.

TABLE IV

| Magnification Rating | Focal Length | Numerical Aperture |
| --- | --- | --- |
| 0.8× | 16.517 | 0.09 |
| 2.0× | 15.806 | 0.25 |
| 8.0× | 6.917 | 0.65 |
| 20× | 3.269 | 1.25 |

As mentioned above, each of the semi-objectives is incompletely corrected for aberations and is designed with due regard to the optical properties of the other semi-objectives in the series or group and together these semi-objectives constitute a matched set. Extensive computation and experiment reveal that optimum imaging conditions are achieved when the axial distance $\alpha$ (FIG. 2) between the cover glass surface P and the intermediate image plane 19 which is formed by each semi-objective per se has a value of substantially 42.6% of the axial distance D from said surface P to the image plane 20 formed by the entire objective lens system. For microscopes of normall tube length, the numerical value of distance $\alpha$ is substantially 80.0 mm.

Figure 2:
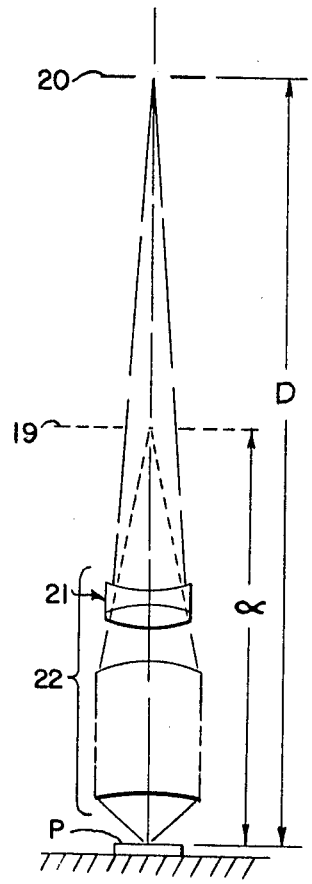
FIG. 2 is an optical diagram which is explanatory of certain features of said invention.

Further comprised in said invention is a field corrector lens 21 which is mounted fixedly in any preferred manner in the stationary portion of the multiple objective nosepiece 18 in optical alignment with the individual semi-objective which is positioned for use. As described above, the corrector lens 21 has negative focal length and compensates both the astigmatism and field curvature produced by the semi-objectives 14–17. The negative focal length of the corrector lens 21 has an optimum value for a standard microscope tube length of 160 mm. as specified hereinafter such that the image field 20 is flattened to an excellent degree. The corresponding ideal magnification rating for corrector lens 21 turns out to be substantially +5×. Using said value of +5× for the corrector lens 21, the calculated values of the focal lengths contained in Table IV for the entire objective lens system 22, FIG. 2, are as shown in Table V herebelow.

TABLE V

| Magnification rating: | Focal length (mm.) |
| --- | --- |
| 4.0× | 27.266 |
| 10× | 13.756 |
| 40× | 3.734 |
| 100× | 1.506 |

As shown in Table VI herebelow, the corrector lens 21 contributes per se an optimum correction for astigmatism in the objective lens system as shown by the numerical values therein:

TABLE VI

| Magnification | Petzval Sum | Tang. Focus | Sag. Focus |
| --- | --- | --- | --- |
| 4.0× | +1.2 | +10.4 | +4.3 |
| 10.0× | +1.4 | +11.8 | +4.9 |
| 40.0× | +0.6 | +8.0 | +3.1 |
| 100.0× | +0.4 | +5.8 | +1.8 |

Within the limits of the above-described objective lens systems, and particularly with regard to the group of semi-objectives, many specific optical designs may be developed and in the case of the 5× magnification negative corrector lens 21 a specific and preferred form of this lens is given hereinafter.

For field corrector lens 21 per se, the equivalent focal length should have a value between $-0.159D$ and $-0.195D$ as defined hereabove and as shown in FIG. 2. Ideally, the value should be substantially $-0.177D$. Lens 21 is composed of a double convex lens element designated X which lies in contact along its rear surface with a double concave lens element designated XI. The focal lengths $F_X$ and $-F_{XI}$ relating to the lens elements X and XI respectively have values as given in the mathematical statements herebelow wherein the minus (—) sign denotes negative focal length.

$0.088D < F_X < 0.108D$
$0.053D < -F_{XI} < 0.065D$

Ideally, the values for $F_X$ and $-F_{XI}$ should be substantially .098D and —0.059D respectively. The corresponding values of axial thicknesses $t_{40}$ and $t_{41}$ for elements X and XI respectively are stated in the following mathematical expressions.

$0.012D < t_{40} < 0.015D$
$0.007D < t_{41} < 0.009D$

Ideally, the values of $t_{40}$ and $t_{41}$ are substantially 0.013D and 0.008D respectively.

Furthermore, lens elements X and XI are made of glass having the following specification of values for refractive index $n_D$ and Abbé number $\nu$.

Absolute values:
    $1.746 < n_D(X) < 1.756$
    $1.608 < n_D(XI) < 1.618$
    $22.0 < \nu(X) < 32.0$
    $40.0 < \nu(XI) < 50.0$ Ideally, $n_D(X) = 1.751$ and $\nu(X) = 27.8$ and
    $n_D(XI) = 1.613$ and $\nu(XI) = 44.2$ As heretofore explained, the plurality of semi-objectives 14–17 constitute an interrelated group or series, each member of the group being designed to be corrected for at least astigmatism and field flatness by combination individually with the aforementioned negative corrector lens 21 and to this end the values for a preferred set of semi-objectives conforming to Tables I to VI are given herebelow, the image magnification produced by the semi-objective members of the group when combined with the corrector lens being 4.0×, 10×, 40× and 100×.

An eyepiece indicated generally by the numeral 25 provides the observer with a magnified image of the primary image 20. It is specifically corrected to reduce the residual aberrations of the plurality of objectives to a minimum, particularly with respect to lateral color. For purposes of illustration, a 10× magnification eyepiece 25 is illustrated and said eyepiece is so constructed optically as to achieve a wide field and compensate all residual lateral color and astigmatism in said image as aforesaid.

THE 0.8× SEMI-OBJECTIVE

Figure 3:
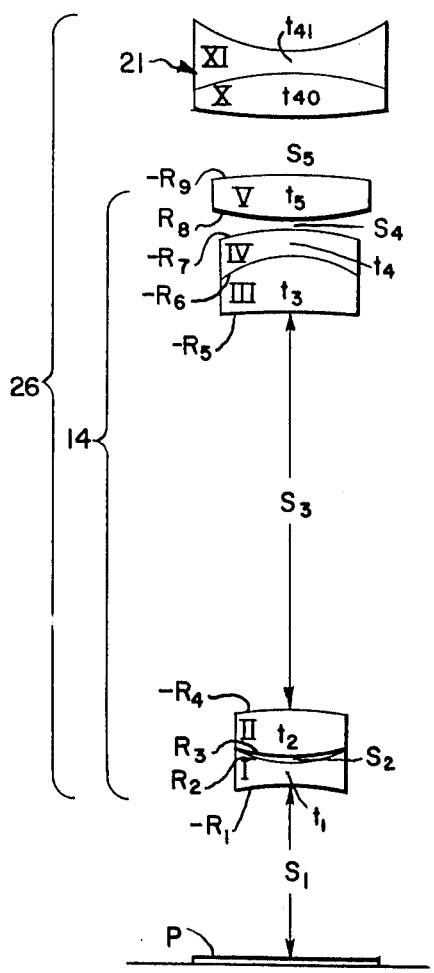

With regard to the construction of the optical parts of the above-mentioned 0.8× semi-objective lens system, a preferred form is shown in FIG. 3 and it is designated generally by the numeral 26. Comprised in said lens system 26 is the aforementioned semi-objective 14 which is constructed to have an image magnification per se of 0.80× and a numerical aperture of substantially 0.09. The equivalent focal length of the entire objective lens system 26 has a value between 0.131D and 0.161D and ideally has a value of substantially 0.145D. Likewise, the equivalent focal length of the semi-objective 14 per se has a value between 0.079D and 0.097D and ideally has a value of substantially 0.088D.

Pertaining to the geometrical form of the semi-objective 14, there is located nearest to the cover glass surface P a compound lens which is composed of a front double concave lens element designated I and is further composed of a double convex lens element designated II lying in edge contact with the rear surface of element I so as to provide a meniscus shaped air space therebetween.

Optically aligned with lens elements I and II and rearwardly spaced therefrom, is provided a second compound lens member which is composed of a front positive meniscus lens element designated III which is concave toward entrant light and a negative meniscus lens element designated IV lying in contact with lens III. Rearwardly spaced from element IV and aligned therewith is a singlet double convex lens designated V.

The constructional data for the 0.8× semi-objective 14 are given in the following Table VII wherein values are specified in terms of D, said data pertaining to:

the focal lengths which are designated $-F_I$ to $F_V$ for the successive lens elements I to V wherein the minus (—) sign denotes negative focal length;

the successive axial air spaces $S_1$ to $S_5$ between the cover glass surface P and the negative corrector lens 21;

the axial thicknesses $t_1$ to $t_5$ of said successive lens elements; the radii of the successive lens surfaces which are designated $-R_1$ to $-R_9$ wherein the minus (—) sign means that the surface is concave toward incident light;

the refractive index designated $n_D(I)$ to $n_D(V)$ of the glass in the successive lens elements I to V;

and the Abbé number designated $\nu$ of the glass in the elements I to V which are designated $\nu(I)$ to $\nu(V)$.

TABLE VII $0.053D < -F_I < 0.065D$
$0.063D < F_{II} < 0.076D$
$0.075D < F_{III} < 0.092D$
$0.099D < -F_{IV} < 0.121D$
$0.120D < F_V < 0.146D$
$0.050D < S_1 < 0.061D$
$0.0010D < S_2 < 0.00011D$
$0.114D < S_3 < 0.139D$
$0.0019D < S_4 < 0.0020D$
$0.015D < S_5 < 0.019D$
$0.007D < t_1 < 0.009D$
$0.012D < t_2 < 0.015D$
$0.014D < t_3 < 0.018D$
$0.009D < t_4 < 0.011D$
$0.012D < t_5 < 0.015D$
$0.082D < -R_1 < 0.100D$
$0.058D < R_2 < 0.070D$
$0.061D < R_3 < 0.074D$
$0.153D < -R_4 < 0.187D$
$0.384 < -R_5 < 0.469D$
$0.036D < -R_6 < 0.044D$
$0.076D < -R_7 < 0.093D$
$0.090D < R_8 < 0.109D$
$0.187 < -R_9 < 0.229D$

Absolute values:
    $1.615 < n_D(I) < 1.625$
    $1.715 < n_D(II) < 1.725$
    $1.510 < n_D(III) < 1.518$
    $1.746 < n_D(IV) < 1.756$
    $1.510 < n_D(V) < 1.518$
    $56.0 < \nu(I) < 64.0$
    $26.0 < \nu(II) < 34.0$
    $65.0 < \nu(III) < 75.0$
    $23.0 < \nu(IV) < 33.0$
    $65.0 < \nu(V) < 75.0$ Ideally, the values for the constructional data for the 0.8× semi-objective 14 are substantially as stated in Table VIII herebelow, the symbolism remaining the same as in Table VII.

TABLE VIII $-F_I = 0.059D$
$F_{II} = 0.069D$
$F_{III} = 0.084D$
$-F_{IV} = 0.110D$
$F_V = 0.133D$
$S_1 = 0.056D$ $S_2 = 0.0001D$
$S_3 = 0.127D$
$S_4 = 0.002D$
$S_5 = 0.017D$
$t_1 = 0.008D$
$t_2 = 0.013D$
$t_3 = 0.016D$
$t_4 = 0.010D$
$t_5 = 0.013D$
$-R_1 = 0.090D$
$R_2 = 0.064D$
$R_3 = 0.068D$
$-R_4 = 0.170D$
$-R_5 = 0.426D$
$-R_6 = 0.040D$
$-R_7 = 0.084D$
$R_8 = 0.100D$
$-R_9 = 0.208D$

Absolute values:
 $n_D(I) = 1.620$
 $n_D(II) = 1.720$
 $n_D(III) = 1.514$
 $n_D(IV) = 1.751$
 $n_D(V) = 1.514$
 $\nu(I) = 60.3$
 $\nu(II) = 29.3$
 $\nu(III) = 70.0$
 $\nu(IV) = 27.8$
 $\nu(V) = 70.0$

THE 2.0× SEMI-OBJECTIVE

Figure 4:
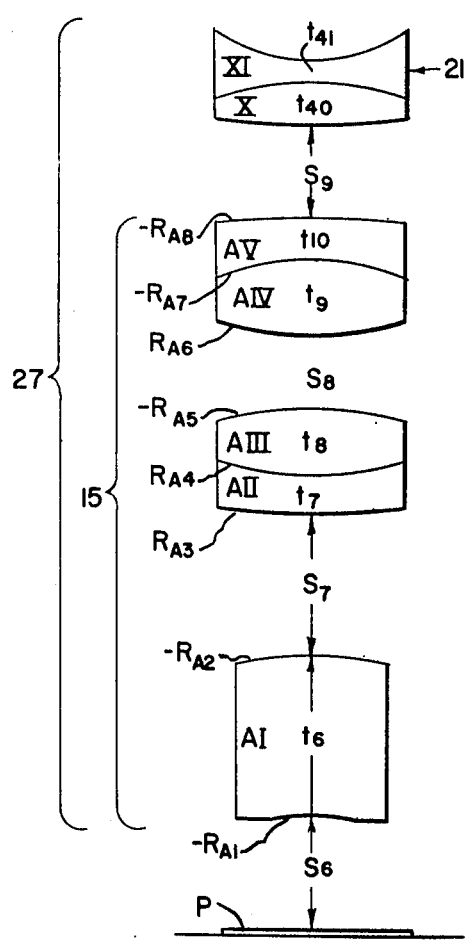

With regard to the construction of the optical parts of the above-mentioned 2× semi-objective lens system, a preferred form is shown in FIG. 4 and it is designated generally by the numeral 15 and is part of a lens system 27. Comprised in said lens system 27 is the aforementioned semi-objective 15 which is constructed to have an image magnification by itself of 2× and a numerical aperture of substantially 0.25. The equivalent focal length of the entire objective lens system 27 has a value between 0.066D and 0.080D and ideally has a value of substantially 0.073D. Likewise, the equivalent focal length of the semi-objective 15 per se has a value between 0.076D and 0.092D and ideally has a value of substantially 0.084D.

Pertaining to the geometrical form of the semi-objective 15, there is located nearest to the cover glass surface P a thick singlet meniscus lens designated AI followed in spaced relation thereto by a front compound lens which is composed of a front negative meniscus lens element which is concave toward the rear and is designated AII. Lying in contact with the rear face of lens element AII is a rear double convex lens element which is designated AIII. In optical alignment with the front lens AI and the front compound lens and spaced rearwardly from said compound lens is a second compound lens which is composed of a front double convex lens element which is designated AIV. Lying in contact with the rear surface of element AIV is a rear negative meniscus lens element designated AV.

The foremost lens AI is spaced rearwardly from the cover glass surface P by a axial distance which is designated $S_6$ and said first compound lens is spaced at an axial distance $S_7$ rearwardly therefrom. The two compound lenses are axially spaced from each other by a distance $S_8$ and the rearmost compound lens is spaced at a distance $S_9$ from the negative corrector lens 21.

The axial thicknesses of the successive lens elements numbered from the front are designated $t_6$ for lens AI to $t_{10}$ for the rearmost element AV.

The constructional data for the 2× semi-objective 15 is given in the following Table IX wherein values in terms of D are specified, said data pertaining to:

the focal lengths which are designated $F_{AI}$ to $-F_{AV}$ for the successive lens elements AI to AV wherein the minus (—) sign denotes negative focal length;

the successive axial air spaces $S_6$ to $S_9$ between the cover glass surface P and the negative corrector lens 21;

the axial thicknesses $t_6$ to $t_{10}$ of the successive lens elements;

the radii of the successive lens surfaces which are designated $-RA_1$ to $-RA_8$ wherein the minus (—) sign means that the surface is concave toward incident light;

the refractive index designated $n_D(AI)$ to $n_D(AV)$ of the glass in the successive lens elements AI to AV;

and the Abbe number designated $\nu$ of the glass in the elements AI to AV which are designated $\nu(AI)$ to $\nu(AV)$;

TABLE IX $0.154D < F_{AI} < 0.188D$
$0.153D < -F_{AII} < 0.187D$
$0.099D < F_{AIII} < 0.120D$
$0.070D < F_{AIV} < 0.085D$
$0.110D < -F_{AV} < 0.134D$
$0.033D < S_6 < 0.040D$
$0.041D < S_7 < 0.050D$
$0.021D < S_8 < 0.025D$
$0.028D < S_9 < 0.034D$
$0.049D < t_6 < 0.060D$
$0.010D < t_7 < 0.012D$
$0.019D < t_8 < 0.023D$
$0.021D < t_9 < 0.026D$
$0.014D < t_{10} < 0.017D$
$0.108D < -R_{A1} < 0.132D$
$0.062D < -R_{A2} < 0.076D$
$0.620D < R_{A3} < 0.757D$
$0.090D < R_{A4} < 0.109D$
$0.110D < -R_{A5} < 0.134D$
$0.095D < R_{A6} < 0.116D$
$0.073D < -R_{A7} < 0.089D$
$2.512D < -R_{A8} < 3.071D$

Absolute values:
 $1.660 < -n_D(AI) < 1.670$
 $1.648 < n_D(AII) < 1.694$
 $1.512 < n_D(AIII) < 1.522$
 $1.615 < n_D(AIV) < 1.625$
 $1.648 < n_D(AV) < 1.694$
 $38.0 < \nu(AI) < 46.0$
 $26.0 < \nu(AII) < 35.0$
 $60.0 < \nu(AIII) < 70.0$
 $56.0 < \nu(AIV) < 64.0$
 $26.0 < \nu(AV) < 35.0$ Ideally, the values for the constructional data for the 2× semi-objective 15 are substantially as stated in Table X herebelow, the symbolism remaining the same as in the previous table:

TABLE X $F_{AI} = 0.171D$
$-F_{AII} = 0.170D$
$F_{AIII} = 0.110D$
$F_{AIV} = 0.078D$
$-F_{AV} = 0.122D$
$S_6 = 0.037D$
$S_7 = 0.046D$
$S_8 = 0.023D$
$S_9 = 0.031D$
$t_6 = 0.054D$
$t_7 = 0.011D$
$t_8 = 0.021D$
$t_9 = 0.023D$
$t_{10} = 0.015D$
$-R_{AI} = 0.120D$
$-R_{A2} = 0.069D$
$R_{A3} = 0.688D$ $R_{A4} = 0.100D$
$-R_{A5} = 0.122D$
$R_{A6} = 0.105D$
$-R_{A7} = 0.081D$
$-R_{A8} = 2.792D$

Absolute values:
 $n_D(AI) = 1.665$
 $n_D(AII) = 1.689$
 $n_D(AIII) = 1.517$
 $n_D(AIV) = 1.620$
 $n_D(AV) = 1.689$
$\nu(AI) = 42.0$
$\nu(AII) = 30.9$
$\nu(AIII) = 64.5$
$\nu(AIV) = 60.3$
$\nu(AV) = 30.9$

THE 8× SEMI-OBJECTIVE

With regard to the construction of the optical parts of the above-mentioned 8× semi-objective lens system, a preferred form is shown in FIG. 5 at 16 which is a part of an optical system designated generally by the numeral 28. Comprised in said lens system 28 is the aforementioned semi-objective 16 which is constructed to have an image magnification per se of 8× and a numerical aperture of substantially 0.65. The equivalent focal length of the entire objective lens system 28 has a value between 0.018D and 0.022D and ideally has a value of substantially 0.020D. Likewise, the equivalent focal length of the semi-objective 16 per se has a value between 0.033D and 0.040D and ideally has a value of substantially 0.037D.

Pertaining to the geometrical form of the semi-objective 16, there is located nearest to the cover glass surface P a singlet positive meniscus lens of thick construction which is designated BI. In optical alignment rearwardly of lens BI is a succession of lens, the nearest of which is air spaced at a short distance therefrom and has a positive meniscus form, said lens being designated BII. Spaced rearwardly from lens BII is a front compound lens which is composed of a front negative meniscus lens which is concave toward the rear and is designated BIII. Lying in contact with the rear face of lens BIII is a double convex lens element which is designated BIV. Spaced still further rearwardly is a rear compound lens which is composed of a front negative meniscus lens which is designated BV and is concave toward the rear. Lying in contact with the rear surface of lens element BV is a double convex lens element which is designated BVI.

The successive axial air spaces between the cover glass surface P and the corrector lens 21 are designated $S_{10}$ to $S_{14}$ and the axial thicknesses of the successive lens elements are designated $t_{11}$ to $t_{16}$ for the lens elements BI to BVI respectively.

The constructional data for the 8× semi-objective 16 is given in the following Table XI wherein values in terms of D are specified, said data pertaining to:

the focal lengths which are designated $F_{BI}$ to $F_{BVI}$ for the successive elements BI to BVI wherein the minus (−) sign denotes negative focal length;
the successive axial air spaces $S_{10}$ to $S_{14}$;
the axial thicknesses $t_{11}$ to $t_{16}$;
the radii of the successive lens surfaces on said lens elements, the surfaces being designated in order as $-R_{B1}$ to $-R_{B10}$ wherein the minus (−) sign means that the surface is concave toward incident light;
the refractive index designated $n_D(BI)$ to $n_D(BVI)$ of the glass in the successive lens elements BI to BVI;
and the Abbé number designated $\nu$ of the glass in the elements BI to BVI which are designated $\nu(BI)$ to $\nu(BVI)$;

TABLE XI $0.070D < F_{BI} < 0.086D$
$0.115D < F_{BII} < 0.140D$
$0.100D < -F_{BIII} < 0.122D$
$0.074D < F_{BIV} < 0.090D$
$0.101D < -F_{BV} < 0.123D$
$0.070D < F_{BVI} < 0.085D$
$0.003D < S_{10} < 0.004D$
$0.001D < S_{11} < 0.002D$
$0.002D < S_{12} < 0.003D$
$0.002D < S_{13} < 0.003D$
$0.120D < S_{14} < 0.146D$
$0.034D < t_{11} < 0.042D$
$0.012D t_{12} < 0.015D$
$0.007D < t_{13} < 0.009D$
$0.018D < t_{14} < 0.022D$
$0.015D < t_{15} < 0.018D$
$0.020D < t_{16} < 0.024D$
$0.030D < -R_{B1} < 0.037D$
$0.026D < -R_{B2} < 0.031D$
$0.377D < -R_{B3} < 0.461D$
$0.052D < -R_{B4} < 0.063D$
$0.331D < R_{B5} < 0.405D$
$0.059D < R_{B6} < 0.072D$
$0.096D < -R_{B7} < 0.118D$
$0.194D < R_{B8} < 0.237D$
$0.052D < R_{B9} < 0.064D$
$0.098D < -R_{B10} < 0.120D$

Absolute values:
 $1.615 < n_D(BI) < 1.625$
 $1.510 < n_D(BII) < 1.518$
 $1.715 < n_D(BIII) < 1.725$
 $1.510 < n_D(BIV) < 1.518$
 $1.744 < n_D(BV) < 1.754$
 $1.510 < n_D(BVI) < 1.518$
 $55.0 < \nu(BI) < 65.0$
 $65.0 < \nu(BII) < 75.0$
 $24.0 < \nu(BIII) < 34.0$
 $65.0 < \nu(BIV) < 75.0$
 $30.0 < \nu(BV) < 40.0$
 $65.0 < \nu(BVI) < 75.0$ Ideally, the values for the constructional data for the 8× semi-objective 16 are substantially as stated in Table XII herebelow, the symbolism remaining the same as in the previous table:

TABLE XII $F_{BI} = 0.078D$
$F_{BII} = 0.127D$
$-F_{BIII} = 0.111D$
$F_{BIV} = 0.082D$
$-F_{BV} = 0.112D$
$F_{BVI} = 0.077D$
$S_{10} = 0.003D$
$S_{11} = 0.001D$
$S_{12} = 0.003D$
$S_{13} = 0.003D$
$S_{14} = 0.133D$
$t_{11} = 0.038D$
$t_{12} = 0.013D$
$t_{13} = 0.008D$
$t_{14} = 0.020D$
$t_{15} = 0.016D$
$t_{16} = 0.022D$
$-R_{B1} = 0.034D$
$-R_{B2} = 0.028D$
$-R_{B3} = 0.418D$
$-R_{B4} = 0.057D$
$R_{B5} = 0.368D$
$R_{B6} = 0.065D$
$-R_{B7} = 0.107D$
$R_{B8} = 0.216D$
$R_{B9} = 0.058D$
$-R_{B10} = 0.109D$

Absolute values:
 $n_D(BI) = 1.620$
 $n_D(BII) = 1.514$ $n_D(BIII) = 1.720$
$n_D(BIV) = 1.514$
$n_D(BV) = 1.749$
$n_D(BVI) = 1.514$
$\nu(BI) = 60.3$
$\nu(BII) = 70.0$
$\nu(BIII) = 29.3$
$\nu(BIV) = 70.0$
$\nu(BV) = 35.0$
$\nu(BVI) = 70.0$

THE 20× SEMI-OBJECTIVE

With regard to the construction of the optical parts of the above-mentioned 20× semi-objective lens system, a preferred form is shown in FIG. 6 and it is designated generally by the numeral 17. Said semi-objective 17 is comprised in the aforesaid objective lens system 30 and is constructed to have an image magnification per se of 20× and a numerical aperture of 1.25. The equivalent focal length of the entire objective lens system 30 has a value between 0.007D and 0.009D and ideally has a value of substantially 0.008D. Likewise, the equivalent focal length of the semi-objective 17 per se has a value between 0.016D and 0.019D and ideally has a value of substantially 0.017D.

Pertaining to the geometrical form of the semi-objective 17, there is located nearest to the cover glass surface P a compound lens which includes a foremost plane parallel plate designated CI, said semi-objective being of the oil immersion type having a suitable liquid located between surface P and plate CI. Contacting the rear surface of element CI is a hemispherical lens element designated CII. Spaced rearwardly from and in axial alignment with element CII there is provided a positive meniscus singlet lens designated CIII and spaced rearwardly from this lens is a double convex singlet lens designated CIV. Rearwardly of the last-named lens is a succession of two compound lenses of similar construction, the foremost of which is composed of a negative meniscus lens element which is designated CV and is concave toward the rear. In contact with the concave surface of lens element CV is a double convex lens element which is designated CVI, and spaced rearwardly therefrom is the foremost element which is designated CVII of the rear compound lens. In contact with the concave surface of lens element CVII is a double convex lens element designated CVIII and spaced rearwardly from said element is a rearmost positive meniscus singlet lens which is designated CIX.

A considerable distance rearwardly of the meniscus lens CIX is located the negative corrector lens 21 which is common to all of the semi-objectives 14 to 17 and is described in detail heretofore.

The constructional data for the 20× semi-objective 17 is given in the following Table XIII wherein values for the data in terms of D are specified, said values pertaining to:

the successive air spaces between the cover glass surface P and the negative corrector lens 21 which are $S_{15}$ to $S_{21}$;
the focal lengths of the successive lens elements CI to CIX which are designated $F_{CI}$ to $F_{CIX}$, wherein the minus (−) sign denotes negative focal length;
the axial thicknesses of the aforesaid lens elements being designated $t_{17}$ to $t_{25}$;
the radii of the successive lens surfaces on said lens elements being designated $R_{C1}$ to $R_{C15}$, wherein the minus (−) sign means that the surface is concave toward incident light;
the refractive index of the glass in the successive lens elements CI to CIX being designated $n_D(CI)$ to $n_D(CIX)$;
and the Abbé number of the glasses in said elements being designated $\nu(CI)$ to $\nu(CIX)$;

TABLE XIII $F_{CI} =$ Plano
$0.017D < F_{CII} < 0.020D$
$0.074D < F_{CIII} < 0.090D$
$0.091D < F_{CIV} < 0.111D$
$0.076D < -F_{CV} < 0.093D$
$0.066D < F_{CVI} < 0.081D$
$0.077D < -F_{CVII} < 0.094D$
$0.073D < F_{CVIII} < 0.089D$
$1.224D < F_{CIX} < 1.496D$
$0.005D < S_{15} < 0.0007D$
$0.000 < S_{16} < 0.0002D$
$0.0024D < S_{17} < 0.0029D$
$0.0004D < S_{18} < 0.0006D$
$0.0004D < S_{19} < 0.0006D$
$0.0011D < S_{20} < 0.0013D$
$0.1250D < S_{21} < 0.1528D$
$0.005D < t_{17} < 0.006D$
$0.010D < t_{18} < 0.013D$
$0.011D < t_{19} < 0.013D$
$0.011D < t_{20} < 0.014D$
$0.007D < t_{21} < 0.009D$
$0.017D < t_{22} < 0.020D$
$0.007D < t_{23} < 0.009D$
$0.017D < t_{24} < 0.020D$
$0.019D < t_{25} < 0.024D$
$R_{C1} =$ Plano
$R_{C2} =$ Plano
$0.010D < -R_{C3} < 0.013D$
$0.062D < -R_{C4} < 0.076D$
$0.028D < -R_{C5} < 0.034D$
$0.337D < R_{C6} < 0.412D$
$0.053D < -R_{C7} < 0.065D$
$0.286D < R_{C8} < 0.349D$
$0.045D < R_{C9} < 0.055D$
$0.120D < -R_{C10} < 0.147D$
$0.270D < R_{C11} < 0.331D$
$0.045D < R_{C12} < 0.055D$
$0.187D < -R_{C13} < 0.229D$
$0.064D < R_{C14} < 0.079D$
$0.064D < R_{C15} < 0.079D$ Absolute Values:
$1.665 < n_D(CI) < 1.675$
$1.615 < n_D(CII) < 1.625$
$1.615 < n_D(CIII) < 1.625$
$1.500 < n_D(CIV) < 1.518$
$1.700 < n_D(CV) < 1.740$
$1.500 < n_D(CVI) < 1.518$
$1.700 < n_D(CVII) < 1.740$
$1.500 < n_D(CVIII) < 1.518$
$1.500 < n_D(CIX) < 1.518$
$42.0 < \nu(CI) < 52.0$
$55.0 < \nu(CII) < 65.0$
$55.0 < \nu(CIII) < 65.0$
$65.0 < \nu(CIV) < 75.0$
$26.0 < \nu(CV) < 36.0$
$65.0 < \nu(CVI) < 75.0$
$26.0 < \nu(CVII) < 36.0$
$65.0 < \nu(CVIII) < 75.0$
$65.0 < \nu(CIX) < 75.0$ Ideally, the values for the constructional data for the 20× semi-objective 17 are substantially as stated in Table XIV herebelow, the symbolism remaining the same as heretofore:

TABLE XIV $F_{CI} =$ Plano
$F_{CII} = 0.019D$
$F_{CIII} = 0.082D$
$F_{CIV} = 0.101D$
$-F_{CV} = 0.084D$ $F_{CVI} = 0.074D$
$-F_{CVII} = 0.085D$
$F_{CVIII} = 0.081D$
$F_{CIX} = 1.360D$
$S_{15} = 0.0006D$
$S_{16} = 0.00013D$
$S_{17} = 0.0027D$
$S_{18} = 0.0005D$
$S_{19} = 0.0005D$
$S_{20} = 0.0012D$
$S_{21} = 0.1389D$
$t_{17} = 0.006D$
$t_{18} = 0.011D$
$t_{19} = 0.012D$
$t_{20} = 0.013D$
$t_{21} = 0.008D$
$t_{22} = 0.019D$
$t_{23} = 0.008D$
$t_{24} = 0.019D$
$t_{25} = 0.021D$
$R_{C1} = $ Plano
$R_{C2} = $ Plano
$-R_{C3} = 0.012D$
$-R_{C4} = 0.069D$
$-R_{C5} = 0.031D$
$R_{C6} = 0.375D$
$-R_{C7} = 0.059D$
$R_{C8} = 0.318D$
$R_{C9} = 0.050D$
$-R_{C10} = 0.134D$
$R_{C11} = 0.300D$
$R_{C12} = 0.050D$
$-R_{C13} = 0.208D$
$R_{C14} = 0.071D$
$R_{C15} = 0.071D$ Absolute values:
$n_D(CI) = 1.670$
$n_D(CII) = 1.620$
$n_D(CIII) = 1.620$
$n_D(CIV) = 1.514$
$n_D(CV) = 1.720$
$n_D(CVI) = 1.514$
$n_D(CVII) = 1.720$
$n_D(CVIII) = 1.514$
$n_D(CIX) = 1.514$
$\nu(CI) = 47.2$
$\nu(CII) = 60.3$
$\nu(CIII) = 60.3$
$\nu(CIV) = 70.0$
$\nu(CV) = 29.3$
$\nu(CVI) = 70.0$
$\nu(CVII) = 29.3$
$\nu(CVIII) = 70.0$
$\nu(CIX) = 70.0$ The salient fact in the foregoing description concerns a microscope objective lens system comprising a plurality of semi-objectives of progressively increasing magnification ratings which together with a negative corrector lens member produce a greatly improved quality in the final image, the semi-objectives being interrelated and designed aberrationwise with respect to each other and their common corrector lens member in a manner which achieves a superior correction particularly of field curvature, astigmatism, coma and spherical aberration. The spherical aberration correction is aided to a considerable degree by the inclusion of a maximum number of low curvature lens surfaces in the optical system.

Although only a single definite form of the present invention has been shown and described in detail for all parts of the objective lens system, other forms are possible and changes may be made in the details of construction within the specified combination and as set forth in Tables I–XVI without departing from the spirit of the invention.

I claim:
1. A multi-powered micro-objective lens system having an object-to-image distance and range of power comparable to standard micro-objectives, for forming a superior image of an object when viewed through an eyepiece lens system, the system comprising;
a plurality of semi-objectives which are interchangeably mounted in a microscope nosepiece for individual optical alignment on the optical axis of the microscope,
the semi-objectives having individual magnifications ranging from low to high values and having a common finite object-to-image distance per se, the focal lengths of the higher-powered semi-objectives being increased to reduce the Petzval sum of the higher-powered semi-objectives without necessitating a change in overall power or object-to-image distance, the object-to-image distance and the magnifications of the semi-objectives being less than the object-to-image distance and magnifications of standard micro-objectives,
the lower-powered semi-objectives having an amount of deliberately introduced lateral color aberration approximately the same as the inherent lateral color aberration in the higher-powered semi-objectives,
a negative lens system aligned at a fixed axial position on the optical axis of the microscope,
the negative lens system being the rearmost component lens member of the micro-objective lens system in common with each individual semi-objective when the semi-objective is in optical alignment on the optical axis of the microscope,
the negative lens system containing amounts of compensating corrective aberrations therein which in individual combination with each one of the semi-objectives reduces the cumulative aberrations in the image with regard to Petzval sum, coma, and astigmatism, which are produced by the complete micro-objective, the aberrations remaining in the image being approximately the same for each of the plurality of semi-objectives when in combination with the negative lens system throughout the complete range of magnification, and
the negative lens system having a minimal effect on the lateral color aberration whereby the lateral color aberration may be corrected by a common eyepiece lens system used in conjunction with all of the semi-objectives.

2. A multi-powered micro-objective lens system having an object-to-image distance and range of power comparable to standard micro-objectives, for forming a superior image of an object when viewed through an eyepiece lens system, the system comprising;
a plurality of semi-objectives which are interchangeably mounted in a microscope nosepiece for individual optical alignment on the optical axis of the microscope, the semi-objectives having individual magnifications ranging from low to high values and forming an image at a common finitely positioned intermediate image plane per se, the focal lengths of the higher-powered semi-objectives being increased to reduce the undercorrected field curvature aberration of the higher-powered semi-objectives without necessitating a change in overall power or object-to-image distance of the micro-objective, the object-to-image distance of the semi-objectives being less than the object-to-image distance of standard micro-objectives,
each of the semi-objectives comprising a lens system which is undercorrected with regard to field curvature, coma, and astigmatism, the lower-powered semi-objectives having an amount of deliberate overcorrection for lateral color approximately the same as the inherent overcorrection for lateral color in the higher-powered semi-objectives, a negative lens system aligned at a fixed axial position on the optical axis of the microscope ahead of the intermediate image plane, the negative lens system being the rearmost component lens member of the micro-objective lens system in common with each individual semi-objective when the semi-objective is in optical alignment on the optical axis of the miscroscope, the negative lens system containing amounts of overcorrected aberrations therein which in individual combination with each one of the semi-objectives reduces the cumulative aberrations in the image with regard to field curvature, coma, and astigmatism, which are produced by the complete micro-objective, the aberrations remaining in the image being substantially identical for each of the plurality of semi-objectives when in combination with the negative lens system, the negative lens system having a minimal effect on the overcorrected lateral color aberration whereby the lateral color may be corrected by a common eyepiece lens system used in conjunction with all of the semi-objectives, and the product of the magnification of any selected one of the semi-objectives multiplied by the magnification of the negative lens system being approximately the same as the magnification of a standard micro-objective having a numerical aperture comparable to the selected combination.

3. A multi-powered micro-objective lens system according to claim 2 wherein the plurality of semi-objectives are mounted in a movable microscope nosepiece.

4. A multi-powered micro-objective lens system according to claim 2 wherein the plurality of semi-objectives are mounted in a rotatable microscope nosepiece.

5. A multi-powered micro-objective lens system according to claim 2 in which the plurality of semi-objectives each have positive focal lengths.

6. A microscope objective system of superior image quality including the combination of a plurality of semi-objectives which are interchangeably mounted in a rotatable nosepiece for optical alignment on the optical axis of the microscope, said semi-objectives having positive focal lengths, and having individual magnifications ranging from low to high values, said semi-objectives having a common finite object-to-image distance per se which is about 42.6 percent of the object-to-image distance of the complete objective lens system, the magnification of each said semi-objective being substantially one-fifth of the magnification of said complete objective system, said semi-objectives per se being undercorrected lens systems with regard to field curvature, coma, and astigmatism, and being overcorrected for lateral color, a negative corrector lens system aligned at a fixed axial position on the optical axis of said objective, said negative system being spaced from said semi-objectives and serving as a rear component which is common to each of said plurality of semi-objectives when aligned therewith, said negative system per se effecting an image magnification of substantially 5× and having an equivalent focal length which is substantially 0.177D where D is the object-to-image distance of the complete objective, said negative lens system having a compensating amount of corrective aberration constructed therein which in combination individually with each of said semi-objectives reduces to minimum values the cumulative aberrations in the image with regard to field curvature, coma, and astigmatism, which are produced by said complete objective system throughout the complete range of magnification.

7. A microscope objective lens system as set forth in claim 6 wherein said negative corrector lens system includes a compound lens which has a meniscus form and is concave toward the image side, said negative lens system comprising a front double convex lens element designated X on the object side thereof and a double concave lens element designated XI lying in contact therewith along an interface on the image side, the focal length of element X being positive and having a value of substantially 0.098D, and the axial thickness having a value of substantially 0.013D, the focal length of element XI being negative and having a value of substantially 0.059D, and the axial thickness having a value of substantially 0.008D, the value for focal length of said corrective negative lens system being substantially −0.177D.

8. A microscope objective lens system of superior image quality comprising a plurality of semi-objectives which are interchangeably mounted in a rotatable nosepiece for selective optical alignment on the axis of the microscope, said semi-objectives having positive focal lengths, and having individual magnifications ranging from low to high values, said semi-objectives having a common finite object-to-image distance per se which is substantially 42.6 percent of the object-to-image distance of the complete objective lens system, the magnifications of each said semi-objective lens system being substantially one-fifth of the magnification of said complete system, said semi-objectives per se being undercorrected lens systems with regard to field curvature, coma and astigmatism, and being overcorrected for lateral color, a negative corrector lens system aligned at a fixed axial position on the optical axis of said objective, said negative system being spaced from said semi-objectives and serving as a rear component which is common to each of said plurality of semi-objectives when aligned therewith, said negative system per se effecting an image magnification of substantially 5× and having an equivalent focal length which is substantially 0.177D where D is the object-to-image distance of the complete objective, said negative lens system including a meniscus compound lens which is concave toward the image side and which includes a front double convex lens element designated X which lies in contact with a rear double concave lens element designated XI, the specific equivalent focal lengths thereof being .098D and −.059D respectively and the specific axial thicknesses thereof being .013D and .008D respectively, said negative lens system having a compensating amount of corrective aberration constructed therein which in combination individually with each of said semi-objectives reduces to minimum values the cumulative aberrations in the image with regard to field curvature, coma, and astigmatism, which are produced by said complete objective system throughout the complete range of magnification, one of said semi-objectives having a magnification rating taken together with the rating of said negative corrector lens system of 4× and its numerical aperture having a value if 0.09, said semi-objective comprising a front compound meniscus lens member consisting of a front double concave lens element designated I which lies in edge contact with a rearward double convex lens element designated II, said member being spaced away from an object to be viewed at an axial distance $S_1$, a second compound meniscus lens member consisting of a front concave-convex lens element designated III which lies in contact along an interface with a negative meniscus lens element designated IV, said compound member being spaced from the first member at an axial distance designated $S_3$, and a singlet double convex lens member designated V which is spaced at an axial distance $S_4$ from the second compound lens member and at a distance designated $S_5$ forwardly from said negative corrector lens, the focal lengths of the successive lens parts I to V being designated respectively $F_I$ to $F_V$ which have specific values substantially as given in the table herebelow in terms of D, the minus (—) sign used with certain F values denoting negative focal lengths, and the successive air spaces being designated $S_1$ to $S_5$ having specific values substantially as given in said table, $S_2$ being the axial space between lenses I and II, the axial thicknesses of said successive lens parts being designated $t_1$ to $t_5$ and having specific values substantially as given in said table, $-F_I = 0.059D$
$F_{II} = 0.069D$
$F_{III} = 0.084D$
$-F_{IV} = 0.110D$
$F_V = 0.133D$
$S_1 = 0.056D$
$S_2 = 0.0001D$
$S_3 = 0.127D$
$S_4 = 0.002D$
$S_5 = 0.017D$
$t_1 = 0.008D$
$t_2 = 0.013D$
$t_3 = 0.016D$
$t_4 = 0.010D$
$t_5 = 0.013D$ 9. A microscope objective lens system of superior image quality comprising a plurality of semi-objectives which are interchangeably mounted in a rotatable nosepiece for selective optical alignment on the optical axis of the microscope, said semi-objectives having positive focal lengths, and having individual magnifications ranging from low to high values, said semi-objectives having a common finite object-to-image distance per se which is substantially 42.6 percent to the object-to-image distance of the complete objective lens system, the magnification of each said semi-objective being substantially one-fifth of the magnification of said complete objective system, said semi-objectives per se being under corrected lens systems with regard to field curvature, coma, and astigmatism, and being overcorrected for lateral color, a negative corrector lens system aligned at a fixed axial position on the optical axis of said objective, said negative system being spaced from said semi-objectives, and serving as a rear component which is common to each of said plurality of semi-objectives when aligned therewith, said negative system per se effecting an image magnification of substantially 5× and having an equivalent focal length which is substantially 0.177D where D is the object-to-image distance of the complete objective, said negative lens system including a meniscus compound lens which is concave toward the image side and which includes a front double convex lens element designated X which lies in contact with a rear double concave lens element designated XI, the specific equivalent focal lengths thereof being .098D and .059D respectively and the specific axial thicknesses thereof being .013D and .008D respectively, said negative lens system having a compensating amount of corrective aberration constructed therein which in combination individually with each of said semi-objectives reduces to minimum values the cumulative aberrations in the image with regard to field curvature, coma, and astigmatism, which are produced by said complete objective system throughout the complete range of magnification, one of said plurality of semi-objectives having a magnification rating taken together with said negative corrector lens system of 10× and a numerical aperture of 0.25, said semi-objective comprising a front thick meniscus lens which is concave toward entrant light and is designated AI, said lens being axially spaced at a distance designated $S_6$ from a cover glass over an object to be viewed, a compound lens spaced at a distance $S_7$ rearwardly from lens AI, said compound lens consisting of a front negative meniscus lens element designated AII which lies in contact with a rear double convex lens element designated AIII, a second compound lens spaced at an axial distance designated $S_8$ rearwardly of the first compound lens and composed of a front double convex lens element designated AIV which is in contact rearwardly with a negative meniscus lens element designated AV, and spaced at a distance $S_9$ from said corrector lens system, the focal lengths of the successive lens parts AI to AV being designated respectively $F_{AI}$ to $F_{AV}$ and having specific values substantially as given in the table herebelow in terms of D, the minus (—) sign used with certain F values denoting negative focal lengths, the successive axial air spaces $S_6$ to $S_9$, and the axial thicknesses designated $t_6$ to $t_{10}$ of the successive lens elements having specific values substantially as given in said table, $F_{AI} = 0.171D$
$-F_{AII} = 0.170D$
$F_{AIII} = 0.110D$
$F_{AIV} = 0.078D$
$-F_{AV} = 0.122D$
$S_6 = 0.037D$
$S_7 = 0.046D$
$S_8 = 0.023D$
$S_9 = 0.031D$
$t_6 = 0.054D$
$t_7 = 0.011D$
$t_8 = 0.021D$
$t_9 = 0.023D$
$t_{10} = 0.015D$ the equivalent focal length of said semi-objective per se having a value of substantially 0.084D.

10. A microscope objective lens system of superior image quality comprising a plurality of semi-objectives which are interchangeably mounted in a rotatable nosepiece for selective optical alignment on the optical axis of the microscope, said semi-objectives having positive focal lengths, and having individual magnifications ranging from low to high values, said semi-objectives having a common finite object-to-image distance per se which is substantially 42.6 percent of the object-to-image distance of the complete objective lens system, the magnification of each said semi-objective being substantially one-fifth of the magnification of said complete objective system, said semi-objectives per se being undercorrected lens systems with regard to field curvature, coma, and astigmatism, and being overcorrected for lateral color, a negative corrector lens system aligned at a fixed axial position on the optical axis of said objective, said negative system being spaced from said semi-objective and serving as a rear component which is common to each of said plurality of semi-objectives when aligned therewith, said negative lens system including a meniscus compound lens which is concave toward the image side and which includes a front double convex lens element designated X which lies in contact with a rear double concave lens element designated XI, the specific equivalent focal lengths thereof being .098D and —.059D respectively and the specific axial thicknesses thereof being .013D and .008D respectively, said negative lens system having a compensating amount of corrective aberration constructed therein which in combination individually with each of said semi-objectives reduces to minimum values the comulative aberrations in the image with regard to field curvature, coma, and astigmatism, which are produced by said complete objective system throughout the complete range of magnification, one of said plurality of semi-objectives having a magnification rating taken together with said negative corrector lens system of 40× and a numerical aperture value of 0.65, said semi-objective comprising a front thick positive meniscus lens which is concave toward entrant light and is designated BI, said lens being axially spaced at a distance $S_{10}$ rearwardly from a cover glass surface, a singlet positive meniscus lens which is concave toward entrant light and is designated BII, said lens being spaced an axial distance designated $S_{11}$ rearwardly of lens BI, a first compound positive lens which is spaced an axial distance $S_{12}$ rearwardly from lens BII and is composed of a front negative meniscus lens element which is convex toward entrant light and is designated BIII and is further composed of a double convex lens element lying in contact with element BIII and is designated BIV, a second compound positive lens which is spaced at an axial distance $S_{13}$ rearwardly from lens element BIV, and is composed of a front negative meniscus lens element designated BV and is further composed of a double convex lens element which is designated BVI and lies in contact with element BV and is spaced forwardly by an axial distance $S_{14}$ from said negative corrector lens system, the focal lengths of the successive lens parts BI to BVI being designated respectively $F_{BI}$ to $F_{BVI}$ and having respective specific values substantially as given in the table herebelow in terms of D, the minus (—) sign used with certain F values denoting negative focal length, the specific values of the successive air spaces $S_{10}$ to $S_{14}$ and axial lens thicknesses $t_{11}$ to $t_{16}$ of the successive lens parts being given substantially in said table, $F_{BI}=0.078D$         $S_{13}=0.003D$
$F_{BII}=0.127D$        $S_{14}=0.133D$
$-F_{BIII}=0.111D$      $t_{11}=0.038D$
$F_{BIV}=0.082D$        $t_{12}=0.013D$
$-F_{BV}=0.112D$        $t_{13}=0.008D$
$F_{BVI}=0.077D$        $t_{14}=0.020D$
$S_{10}=0.003D$         $t_{15}=0.016D$
$S_{11}=0.001D$         $t_{16}=0.022D$
$S_{12}=0.003D$ the equivalent focal length of said semi-objective per se having a value of substantially 0.037D.

11. A microscope objective lens system of superior image quality comprising a plurality of semi-objectives which are interchangeably mounted in a rotatable nosepiece for selective optical alignment on the optical axis of the microscope, said semi-objectives having positive focal lengths, and having individual magnifications ranging from low to high values, said semi-objectives having a common finite object-to-image distance per se which is about 42.6 percent of the object-to-image distance of the complete objective lens system, the magnification of each said semi-objective being substantially one-fifth of the magnification of said complete objective system, said semi-objectives per se being undercorrected lens systems with regard to field curvature, coma, and astigmatism, and being overcorrected for lateral color, a negative corrector lens system aligned at a fixed axial position on the optical axis of said objective, said negative system being spaced from said semi-objectives and serving as a rear component which is common to each of said plurality of semi-objectives when aligned therewith, said negative system per se effecting an image magnification of substantially 5× and having an equivalent focal length which is substantially 0.177D where D is the object-to-image distance of the complete objective, said negative lens system including a meniscus compound lens which is concave toward the image side and which includes a front double convex lens element designated X which lies in contact with a rear double concave lens element designated XI, the specific equivalent focal lengths thereof being .098D and —.059D respectively and the specific axial thicknesses thereof being .013D and .008D respectively, said negative lens system having a compensating amount of corrective aberration constructed therein which in combination individually with each of said semi-objectives reduces to minimum values the cumulative aberrations in the image with regard to field curvature, coma, and astigmatism, which are produced by said complete objective system throughout the complete range of magnification, one of said plurality of semi-objectives having a magnification rating taken together with said negative corrector lens system of 100× and a numerical aperture value of 1.25, said semi-objective comprising a front compound optical member which is axially spaced rearwardly of a cover glass surface at a distance designated $S_{15}$, said member being composed of a foremost plane-parallel plate designated CI and a hemispherical lens element designated CII in contact with the rear surface of said plate, a singlet positive meniscus lens which is concave toward entrant light and is designated CIII, said lens being spaced axially rearwardly of lens CII at a distance designated $S_{16}$, a singlet double convex lens which is designated CIV and is axially spaced at a distance designated $S_{17}$ rearwardly from lens CIII, a first compound lens spaced at an axial distance designated $S_{18}$ rearwardly of lens CIV, said compound lens comprising a front negative meniscus lens element designated CV which is convex toward entrant light and further comprises a double convex lens element which is designated CVI and lies in contact with the rear surface of the element CV, a second compound lens spaced rearwardly of the first compound lens at an axial distance represented by $S_{19}$ and being similar in optical form thereto, the front lens element thereof being designated CVII and the rear lens element being designated CVIII, a rearmost singlet meniscus lens designated CIX which is axially spaced from the second compound lens by a distance designated $S_{20}$ and is separated from the aforesaid negative corrector lens system by an axial distance which is designated $S_{21}$, the focal lengths of the successive lens parts CI to CIX being designated $F_{CI}$ to $F_{CIX}$ respectively and having specific values substantially as given in the table herebelow in terms of D, the minus (—) sign used therewith denoting negative focal length, the specific values for the successive air spaces $S_{15}$ to $S_{21}$ and the axial lens thicknesses $t_{17}$ to $t_{25}$ of the successive lens parts being substantially as given in said table, $F_{CI}$=Plano
$F_{CII}$=0.019D
$F_{CIII}$=0.082D
$F_{CIV}$=0.101D
$-F_{CV}$=0.084D
$F_{CVI}$=0.074D
$-F_{CVII}$=0.085D
$F_{CVIII}$=0.081D
$F_{CIX}$=1.360D
$S_{15}$=0.0006D
$S_{16}$=0.0001D
$S_{17}$=0.0027D
$S_{18}$=0.0005D
$S_{19}$=0.0005D
$S_{20}$=0.0012D
$S_{21}$=0.1389D
$t_{17}$=0.006D
$t_{18}$=0.011D
$t_{19}$=0.012D
$t_{20}$=0.013D
$t_{21}$=0.008D
$t_{22}$=0.019D
$t_{23}$=0.008D
$t_{24}$=0.019D
$t_{25}$=0.021D the equivalent focal length of said semi-objective per se having a value of substantially 0.017D.

References Cited
UNITED STATES PATENTS

| | | | |
|---|---|---|---|
| 3,118,964 | 1/1964 | Buzawa | 350—215 X |
| 3,132,200 | 5/1964 | Muller et al. | 350—45 |

FOREIGN PATENTS 945,467  1/1964  Great Britain.

JOHN K. CORBIN, Primary Examiner

U.S. Cl. X.R.

350—39, 214, 216, 224

PO-1050
(5/69)

UNITED STATES PATENT OFFICE
CERTIFICATE OF CORRECTION

Patent No. 3,481,665            Dated   December 2, 1969

Inventor(s)   Harold E. Rosenberger

It is certified that error appears in the above-identified patent and that said Letters Patent are hereby corrected as shown below:

Col. 8, line 41, change "2,512D" to -- 2.512D --
        line 44, change "-$n_D$" to -- $n_D$ --

Col. 12, line 13, change "0.005D" to -- 0.0005D --

SIGNED AND
SEALED
NOV 10 1970

(SEAL)
Attest:

Edward M. Fletcher, Jr.
Attesting Officer

WILLIAM E. SCHUYLER, JR.
Commissioner of Patents